United States Patent
Rubel et al.

(10) Patent No.: US 7,048,320 B2
(45) Date of Patent: May 23, 2006

(54) VEHICLE MOBILE WORK STATION

(75) Inventors: Aaron Rubel, New Baltimore, MI (US); Brett Giem, Oxford, MI (US); Stephen J Lewis, Harrison Township, MI (US); David B Reed, Lake Orion, MI (US); Victor Kruk, Clarkston, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 39 days.

(21) Appl. No.: 10/461,724

(22) Filed: Jun. 13, 2003

(65) Prior Publication Data

US 2004/0251704 A1    Dec. 16, 2004

(51) Int. Cl.
*B60N 3/12* (2006.01)

(52) U.S. Cl. .................... 296/37.6; 296/37.8

(58) Field of Classification Search ............ 296/24.32, 296/24.43, 24.45, 37.6, 37.13, 37.16, 37.8
See application file for complete search history.

(56) References Cited

U.S. PATENT DOCUMENTS

| | | | |
|---|---|---|---|
| 4,917,430 A * | 4/1990 | Lawrence .................. | 296/37.6 |
| 5,088,636 A | 2/1992 | Barajas | |
| 5,121,306 A | 6/1992 | Palmisano | |
| 5,316,358 A * | 5/1994 | Payne et al. ............... | 296/37.6 |
| 5,398,987 A | 3/1995 | Sturgis | |
| 5,454,684 A * | 10/1995 | Berens ...................... | 296/26.1 |
| 5,464,264 A * | 11/1995 | Wilson ...................... | 296/37.6 |
| 5,542,589 A * | 8/1996 | McKee ..................... | 296/37.15 |
| 5,743,584 A | 4/1998 | Lance et al. | |
| 5,836,496 A * | 11/1998 | Levin et al. ............... | 296/37.8 |
| 5,895,086 A * | 4/1999 | Carico ....................... | 296/37.6 |
| 5,964,492 A | 10/1999 | Lyon | |
| 5,979,118 A | 11/1999 | Gortsema et al. | |
| 5,988,473 A | 11/1999 | Hagan et al. | |
| 6,086,129 A * | 7/2000 | Gray ......................... | 296/37.8 |
| 6,161,896 A | 12/2000 | Johnson et al. | |
| 6,216,927 B1 * | 4/2001 | Meritt ....................... | 296/37.16 |
| 6,279,977 B1 * | 8/2001 | Chen ......................... | 296/37.8 |
| 6,308,873 B1 | 10/2001 | Baldas et al. | |
| 6,375,054 B1 | 4/2002 | Lance et al. | |
| 6,386,412 B1 * | 5/2002 | Konechne ................ | 296/37.16 |
| 6,386,612 B1 | 5/2002 | Hofmann et al. | |
| 6,460,744 B1 | 10/2002 | Lance et al. | |
| 6,471,278 B1 | 10/2002 | Leitner et al. | |
| 2002/0158490 A1 * | 10/2002 | Hutzel ....................... | 296/197 |

* cited by examiner

*Primary Examiner*—Jason Morrow
(74) *Attorney, Agent, or Firm*—Ralph E. Smith

(57) ABSTRACT

A mobile work station assembly for a vehicle. The work station incorporates a docking station, toolbox, file organizer, power inverter, storage container and a mobile phone assembly on a sliding load floor that can extend outwardly from the interior of the vehicle. The work station is removably attached to the load floor. The work station is adapted for mounting in a vehicle interior or within a pickup truck bed.

13 Claims, 4 Drawing Sheets

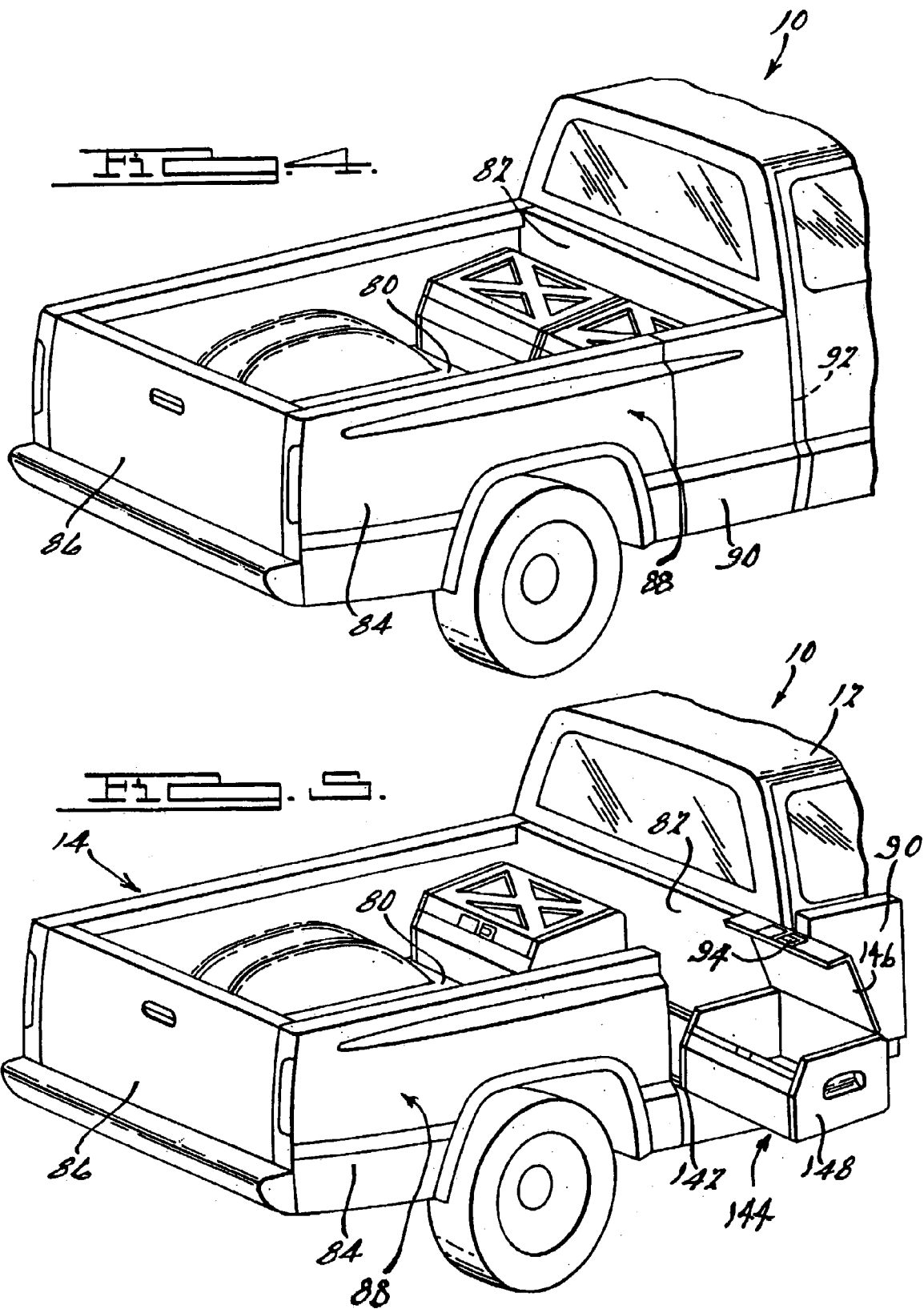

VEHICLE MOBILE WORK STATION

FIELD OF THE INVENTION

The present invention relates to mobile vehicle mounted work stations.

BACKGROUND OF THE INVENTION

Consumer demand has led to the development of vehicles that provide versatility for different uses. U.S. Pat. No. 5,964,492 discloses a storage container for a pickup truck bed that is equipped to slide over the tailgate in order to provide greater access to the items stored in the container. U.S. Pat. No. 6,161,896 discloses a rear seat storage system for an automobile. While these storage systems may be adequate for their intended use, they do not provide a platform that can function as a fully integrated mobile work space. What is needed is a versatile platform that is accessible from the side of the vehicle and can function as a storage system and a mobile work space.

SUMMARY OF THE INVENTION

In accordance with the teachings of the present invention, a mobile work station and storage system is disclosed. In one form, the present invention provides a work station including a load floor slidingly coupled to a vehicle and moveable between a first position in which a portion of the load floor extends beyond an exterior plane of the vehicle and a second position in which the load floor does not extend beyond the exterior plane. The load floor is coupled to a work surface with a DC-AC voltage converter adjacently located thereto.

In another form, the present invention provides a work station including a DC-AC voltage converter, a docking station for a portable computer, and a mobile phone assembly mounted adjacent a surface of the work station.

In yet another form the present invention provides a storage system for a vehicle including a load floor with a first end and a second end. The load floor is slidingly coupled to the vehicle and moveable between a first position, in which the first end of the load floor extends beyond an exterior plane of the vehicle, and a second position, in which the first end of the load floor does not extend beyond the exterior plane. The exterior surface of the vehicle defines the exterior plane. The storage compartment has a lid and is removably attached to the load floor. A door is hingedly supported to a lateral side of the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a perspective view of the mobile work station of FIG. 2, in an extended position.

FIG. 4 is a perspective view of a further embodiment of a mobile work station in a truck bed according to the present invention.

FIG. 5 is a perspective view similar to FIG. 4, but illustrating the work station in an extended position.

DETAILED DESCRIPTION OF THE PREFERRED EMBODIMENTS

The following description of the preferred embodiment(s) is merely exemplary in nature and is in no way intended to limit the invention, its application, or uses.

Figure 1:
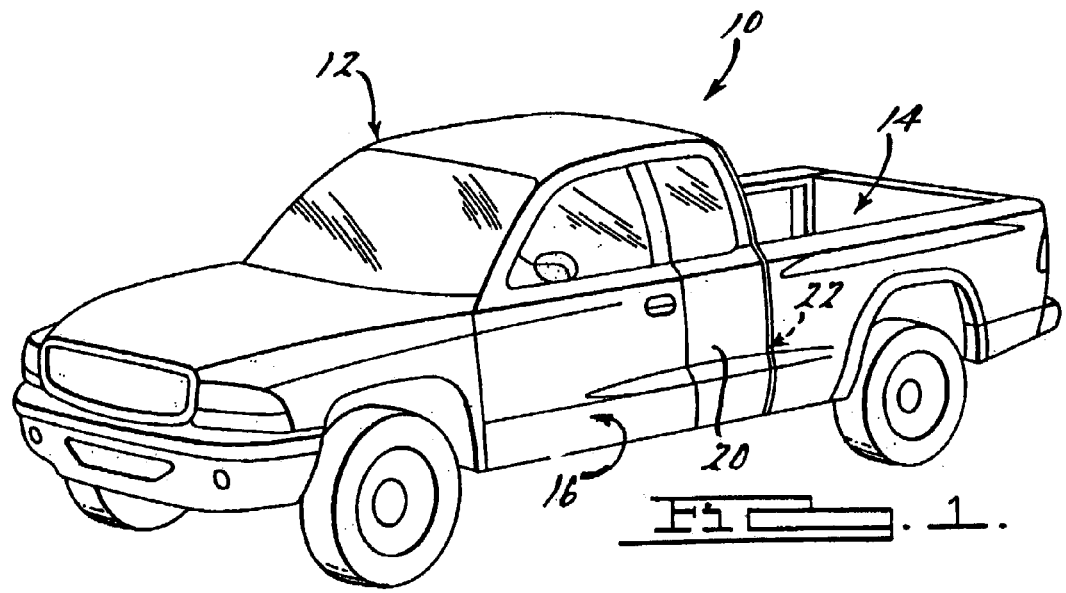
FIG. 1 is a perspective view of an exemplary vehicle for incorporating a mobile work station conforming to the teachings of the present invention.

FIG. 1 illustrates a vehicle 10 including a cab 12 and a bed 14. Preferably, vehicle 10 is an extended cab truck. Cab 12 includes an outer surface 16 defining an exterior plane of vehicle 10 and an access door 20 coupled to cab 12 by hinges 22. Access door 20 rotates about the axes of hinges 22 from a closed position to an open position.

Figure 2:
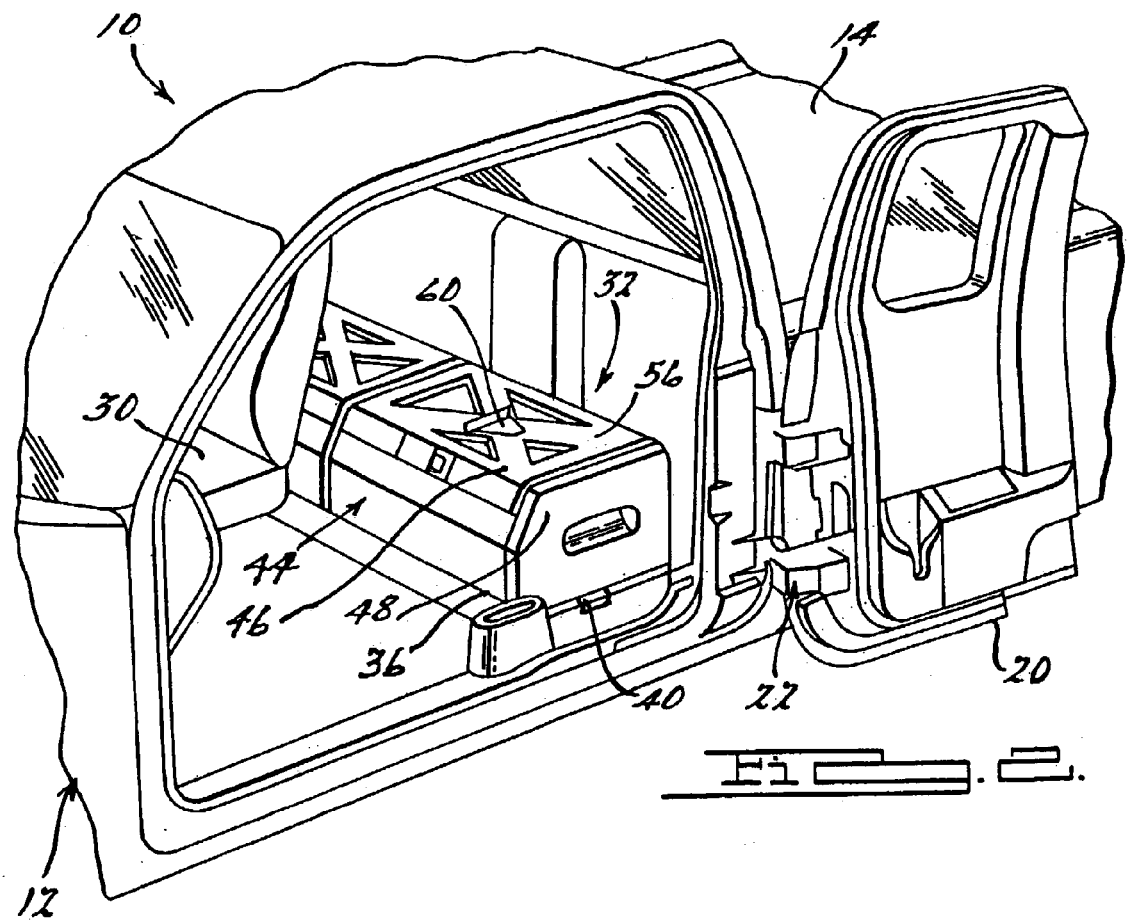
FIG. 2 is a perspective view of a mobile work station according to the invention mounted in the vehicle of FIG. 1.
Figure 2:
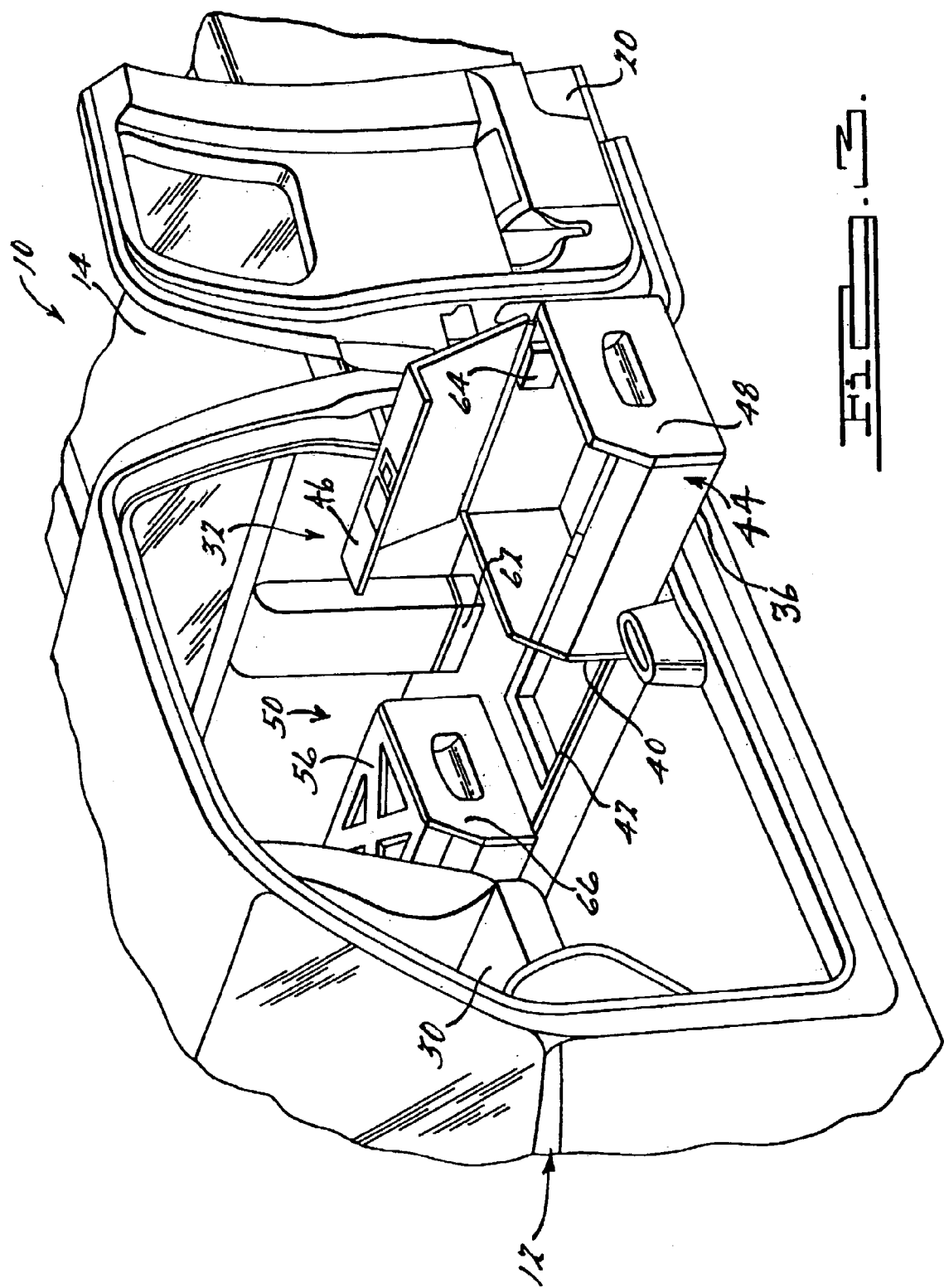

With reference to FIGS. 2 and 3, cab 12 also includes a work station 32 located behind seats 30. Work station 32 includes a load floor 36, a catch mechanism 40, and a sliding mechanism 42. Sliding mechanism 42 is interposed between load floor 36 and cab 12, and allows load floor 36 to move between a stowed position (FIG. 2), wherein load floor 36 is located within cab 12, and an extended position (FIG. 3), wherein at least a portion of load floor 36 extends beyond a plane defined by door 20. Catch mechanism 40 is moveable between a restrained position, wherein sliding mechanism 42 is restricted from lateral movement of load floor 36 relative to cab 12, and an unrestrained position wherein sliding mechanism 42 permits lateral movement of load floor 36 relative to cab 12. Load floor 36 can be locked in the extended position, the stowed position, or in any intermediate position by catch mechanism 40. Catch mechanism 40 is preferably a conventional mechanism for restraining movement of sliding mechanism 42. Load floor 36 includes at least one storage compartment 44 removably attached thereto. Storage compartment 44 includes a lid 46 hingedly supported to a box assembly 48. Lid 46 is moveable between a closed position, in which lid 46 is adjacent box assembly 48, and an open position, in which lid 46 is positioned relative box assembly 48 so as to provide access to the inside of storage compartment 44. Storage compartment 44 is preferably collapsible to provide more available space within vehicle 10 when storage compartment 44 is not needed.

Work station 32 further includes a mobile office 50. Mobile office 50 includes a table surface 56, a docking station 60 for a portable computer, a 120 volt AC converter 62, a mobile phone assembly 64, and an office file organizer 66. Table surface 56 may be defined by an exterior surface of storage compartment 44. Mobile phone assembly 64 preferably includes a frequency transmitter/receiver for wireless communication capability and a speaker phone.

In use, access door 20 is rotated to the open position to provide access to work station 32. A portable computer can be coupled to docking station 60 and office file organizer 66 accessed in order to provide a mobile working location. Mobile phone assembly 64 includes a speaker phone with a cellular phone sending/receiving apparatus. The portable computer can be connected to mobile phone assembly 64 to provide internet or intranet access. The 120 volt AC converter 62 has a 12 VDC input and is available to provide power to work station 32 devices that require an alternating current supply.

Typically, catch mechanism 40 is in the restrained position when work station 32 is accessed, thereby providing a stable work location. When desired, catch mechanism 40 is translated to the unrestrained position wherein load floor 36 is moved to the extended position. Catch mechanism 40 is then translated to the restrained position, thereby preventing undesired movement of work station 32 when in use. It would be apparent that work station 32 provides greater access to storage compartment 44 when load floor 36 is in the extended position. It would also be apparent that vehicle 10 provides a secured, protected environment for work station 32 and storage compartment 44 when load floor 36 is in the stowed position and access door 20 is in the closed position. In this manner, vehicle 10 is provided with a mobile, secure working space. While vehicle 10 is described with one access door 20, it would be recognized by one skilled in the art that vehicle 10 may include additional access doors, either to the rear or opposite side of cab 12, to provide greater access to work station 32. It would also be recognized that work station 32 could be utilized with access door 20 in the closed position.

FIGS. 4 and 5 illustrate the mobile work station 32 described above located in bed 14 in which bed 14 includes a floor 80, a front wall 82, side walls 84 and a tailgate 86. Bed 14 further includes a lateral outside surface 88 defining an exterior plane of bed 14. At least one side wall 84 is defined, in part, by an access door 90. Preferably, a hinge 92 allows access door 90 to rotate 180° about a vertical axis relative to bed 14. Floor 80 has a sliding mechanism 142 attached thereto. A storage compartment 144 is removably attached to the sliding mechanism 142 and moveable between a stowed position (FIG. 4) and an extended position (FIG. 5). Storage compartment 144 includes a lid 146 hingedly supported to a box assembly 148. Lid 146 is moveable between a closed position, in which lid 146 is adjacent box assembly 148, and an open position, in which lid 146 is positioned relative box assembly 148 so as to provide access to the inside of storage compartment 144. Lid 146 overlaps box assembly 148 in such a manner as to provide a weather proof seal when lid 146 is in the closed position. Storage compartment 144 also includes a locking mechanism 94 operably coupled between lid 146 and box assembly 148. Locking mechanism 94 is preferably a conventional locking mechanism that is switchable from a locked position to an unlocked position. Locking mechanism 94 retains lid 146 in the closed position to provide a secured compartment. Manipulation of locking mechanism 94 such as turning a key or entering a security code into a key pad, is required to access the inside of storage compartment 144 when locking mechanism 94 is in the locked position and lid 146 is in the closed position.

Figure 6:
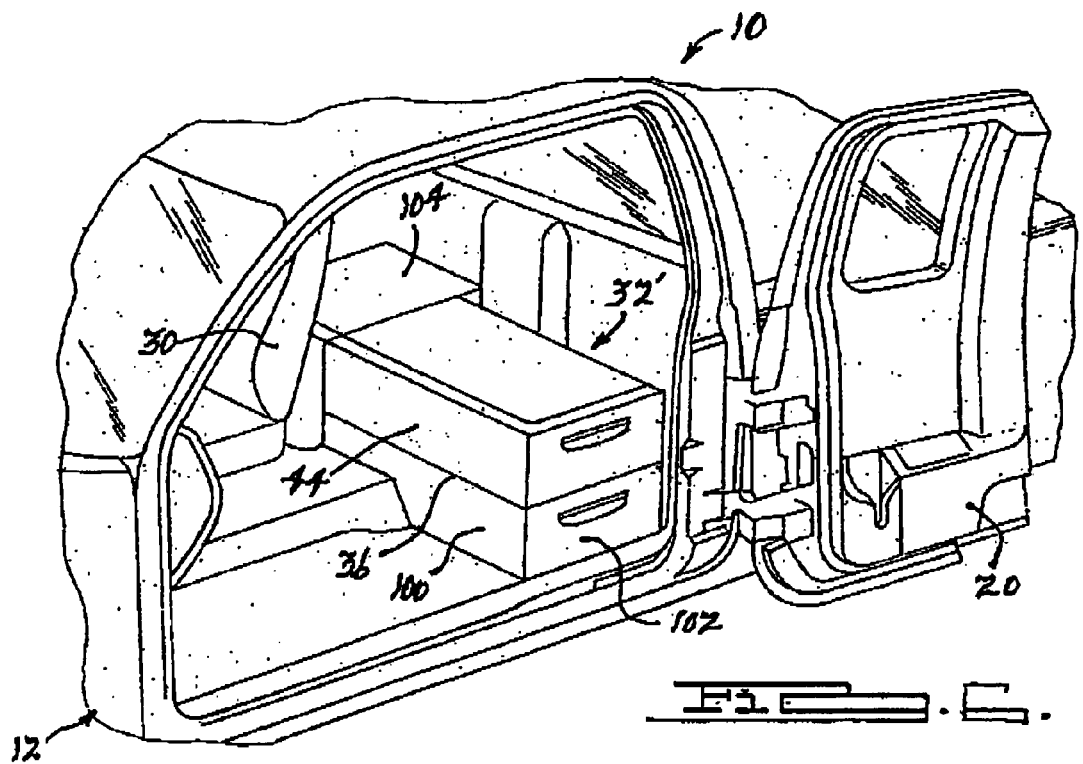
FIG. 6 is a perspective view of a further embodiment of a mobile work station according to the invention.
Figure 7:
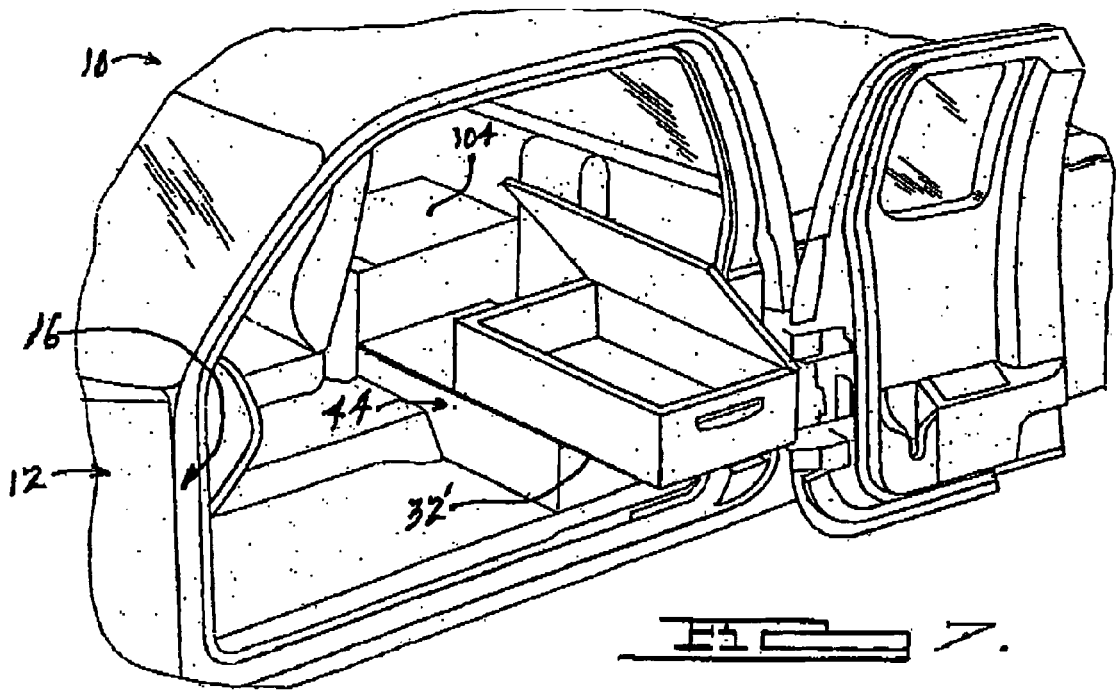
FIG. 7 is a perspective view of the mobile workstation of FIG. 6, in an extended position.

Referring now to FIGS. 6 and 7, vehicle 10 is illustrated including a work station 32' as an alternate embodiment of work station 32 wherein load floor 36 is attached to a frame 100 located behind seat 30. In this embodiment, storage compartment 44 is slideable between a first position (FIG. 6) and a second position (FIG. 7). Frame 100 encompasses a cavity having a drawer 102 slideably coupled therein such that drawer 102 is moveable between a closed position (FIG. 6) and an open position (not shown), wherein drawer 102 extends beyond the plane defined by cab outer surface 16. A toolbox 104 is located adjacent frame 100.

While FIGS. 1–7 depict vehicle 10 as a truck, it will be appreciated that virtually any vehicle could be modified with the present invention as disclosed. It would also be appreciated that the description of the invention is merely exemplary in nature and, thus, variations that do not depart from the gist of the invention are intended to be within the scope of the invention. Such variations are not to be regarded as a departure from the spirit and scope of the invention.

What is claimed is:

1. A mobile work station comprising:
    a load floor adapted to slidingly couple to a floor of a cargo bed of a truck and be moveable between a first position in which a portion of the load floor extends beyond an exterior plane of a wall of the cargo bed through an opening in the wall and a second position in which the load floor does not extend beyond the exterior plane;
    a storage compartment removably attached to the load floor;
    a work surface coupled to the load floor; and
    a vehicle door pivotably coupled to the opening for closing same in a closed position and pivotable to an open position enabling full access to the work surface in both the first and second positions.

2. The work station of claim 1, wherein the storage compartment is collapsible.

3. The work station of claim 1, further comprising a catch mechanism coupled to the load floor, wherein the catch mechanism is configured to restrain movement of the load floor relative to the vehicle.

4. The work station of claim 1, further comprising a tool box.

5. A storage system for a vehicle having an exterior surface defining an exterior plane, the storage system comprising:
    a load floor having a first end and a second end, wherein the load floor is adapted to slidingly couple to the vehicle and be moveable between a first position in which the first end of the load floor extends beyond the exterior plane of the vehicle and a second position in which the first end of the load floor does not extend beyond the exterior plane; and
    a storage compartment having a lid and being removably attached to the load floor,
    wherein the vehicle comprises a door pivotally attached to the vehicle and forming a portion of the exterior surface, the door being pivotable from a closed position to an open position, and
    wherein the vehicle is a pickup truck and the storage system is adapted for mounting within the bed of the truck.

6. The storage system of claim 5, wherein the storage compartment is collapsible.

7. The storage system of claim 5, further comprising a restraining mechanism to removably attach the storage compartment to the load floor.

8. The storage system of claim 5, further comprising a locking mechanism adapted to retain the lid in a closed position, wherein the locking mechanism is switchable from a locked position to an unlocked position.

9. The storage system of claim 5, further comprising a catch mechanism for coupling the load floor to the vehicle, for restraining movement of the load floor relative to the vehicle.

10. The storage system of claim 5, further comprising a frame adapted for mounting to the vehicle, wherein the load floor is slidingly coupled to the vehicle through the frame, and the frame defines a cavity for housing a drawer beneath the load floor.

11. The work station of claim 1, further comprising a DC-AC voltage converter positioned proximate the work surface.

12. The mobile work station of claim 1, wherein the work surface is defined by an exterior surface of the storage compartment.

13. The mobile work station of claim 12, wherein the exterior surface is a lid of the storage compartment.

* * * * *